United States Patent
Schinner et al.

(10) Patent No.: US 7,768,558 B1
(45) Date of Patent: Aug. 3, 2010

(54) DIGITAL STILL CAMERA WITH REMAINING PICTURE COUNT INDICATION

(75) Inventors: Charles E Schinner, San Diego, CA (US); Brad Beall, Poway, CA (US); Jerry R. Potts, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3209 days.

(21) Appl. No.: 09/676,649

(22) Filed: Sep. 29, 2000

(51) Int. Cl.
*H04N 5/76* (2006.01)
(52) U.S. Cl. ............... 348/231.99; 348/220.1; 348/231.3; 348/231.7; 348/231.8
(58) Field of Classification Search ............. 348/231.1, 348/231.2, 523, 208.13, 208.15, 208.16, 348/231.99, 231.3, 231.7, 231.9, 220.1; 358/404
See application file for complete search history.

(56) References Cited

U.S. PATENT DOCUMENTS

| | | | |
|---|---|---|---|
| 4,746,993 A | 5/1988 | Tada | 358/335 |
| 5,027,214 A | 6/1991 | Fujimori | 358/209 |
| 5,034,804 A | 7/1991 | Sasaki et al. | 358/41 |
| 5,481,303 A * | 1/1996 | Uehara | 348/231.1 |
| 5,903,677 A * | 5/1999 | Kosugi et al. | 382/246 |
| 6,122,411 A * | 9/2000 | Shen et al. | 382/299 |
| 6,233,010 B1* | 5/2001 | Roberts et al. | 348/240.99 |
| 6,282,605 B1* | 8/2001 | Moore | 711/103 |
| 6,433,820 B1* | 8/2002 | Koide et al. | 348/231.99 |
| 6,603,509 B1* | 8/2003 | Haruki | 348/231.1 |
| 2003/0058355 A1* | 3/2003 | Wong et al. | 348/231.99 |

* cited by examiner

*Primary Examiner*—Lin Ye
*Assistant Examiner*—Yogesh K Aggarwal

(57) ABSTRACT

In one embodiment, a digital still camera includes: an image sensor for receiving light and generating output signals representative of an image of an object or a scene of interest; a processing circuit connected to the image sensor for processing the output signals from the image sensor; and a control circuit connected to the processing circuit for successively generating a plurality of image files and for determining a remaining picture count after each image file is generated based on one of a plurality of predetermined decrement numbers corresponding to an actual image file size of each image file.

24 Claims, 9 Drawing Sheets

| COMPRESSED IMAGE FILE SIZE | PICTURE COUNT DECREMENT | IMAGE FILE SIZE COMMENTS |
| --- | --- | --- |
| 100KB | 0 | MINIMUM |
| 200KB | 0 | |
| 300KB | 0 | |
| 400KB | 0 | |
| 500KB | 1 | |
| 600KB | 1 | AVERAGE |
| 700KB | 1 | |
| 800KB | 1 | |
| 900KB | 2 | |
| 1000KB | 2 | |
| 1100KB | 2 | |
| 1200KB | 2 | |
| 1300KB | 3 | |
| 1400KB | 3 | MAXIMUM |

FIG. 4

| PICTURE COUNT | THREE DIAMOND MODE | TWO DIAMOND MODE | ONE DIAMOND MODE |
|---|---|---|---|
| 1 | MAX $_{3D}$ | MAX $_{2D}$ | MAX $_{1D}$ |
| 2 | MAX $_{3D}$ + AVG $_{3D}$ | MAX $_{2D}$ + AVG $_{2D}$ | MAX $_{1D}$ + AVG $_{1D}$ |
| 3 | MAX $_{3D}$ + 2 × AVG $_{3D}$ | MAX $_{2D}$ + 2 × AVG $_{2D}$ | MAX $_{1D}$ + 2 × AVG $_{1D}$ |
| 4 | MAX $_{3D}$ + 3 × AVG $_{3D}$ | MAX $_{2D}$ + 3 × AVG $_{2D}$ | MAX $_{1D}$ + 3 × AVG $_{1D}$ |
| 5 | MAX $_{3D}$ + 4 × AVG $_{3D}$ | MAX $_{2D}$ + 4 × AVG $_{2D}$ | MAX $_{1D}$ + 4 × AVG $_{1D}$ |
| 6 | MAX $_{3D}$ + 5 × AVG $_{3D}$ | MAX $_{2D}$ + 5 × AVG $_{2D}$ | MAX $_{1D}$ + 5 × AVG $_{1D}$ |
| 7 | MAX $_{3D}$ + 6 × AVG $_{3D}$ | MAX $_{2D}$ + 6 × AVG $_{2D}$ | MAX $_{1D}$ + 6 × AVG $_{1D}$ |
| 8 | MAX $_{3D}$ + 7 × AVG $_{3D}$ | MAX $_{2D}$ + 7 × AVG $_{2D}$ | MAX $_{1D}$ + 7 × AVG $_{1D}$ |
|  |  |  |  |
| 999 | MAX $_{3D}$ + 998 × AVG $_{3D}$ | MAX $_{2D}$ + 998 × AVG $_{2D}$ | MAX $_{1D}$ + 998 × AVG $_{1D}$ |
| N | MAX $_{3D}$ + (N−1) × AVG $_{3D}$ | MAX $_{2D}$ + (N−1) × AVG $_{2D}$ | MAX $_{1D}$ + (N−1) × AVG $_{1D}$ |

FIG. 5

| MEMORY ADDRESS (HEX) | MEMORY ADDRESS (BINARY) | CF FREE SPACE |
|---|---|---|
| xxxx001H | xxxx 0000 0000 0001 | $MAX_{3D}$ |
| xxxx002H | xxxx 0000 0000 0010 | $MAX_{3D} + AVG_{3D}$ |
| xxxx003H | xxxx 0000 0000 0011 | $MAX_{3D} + 2 \times AVG_{3D}$ |
| xxxx004H | xxxx 0000 0000 0100 | $MAX_{3D} + 3 \times AVG_{3D}$ |
| xxxx005H | xxxx 0000 0000 0101 | $MAX_{3D} + 4 \times AVG_{3D}$ |
| | | |
| xxxx3E6H | xxxx 0011 1110 0110 | $MAX_{3D} + 997 \times AVG_{3D}$ |
| xxxx3E7H | xxxx 0011 1110 0111 | $MAX_{3D} + 998 \times AVG_{3D}$ |
| | | |
| xxxx401H | xxxx 0100 0000 0001 | $MAX_{2D}$ |
| xxxx402H | xxxx 0100 0000 0010 | $MAX_{2D} + AVG_{2D}$ |
| xxxx403H | xxxx 0100 0000 0011 | $MAX_{2D} + 2 \times AVG_{2D}$ |
| xxxx404H | xxxx 0100 0000 0100 | $MAX_{2D} + 3 \times AVG_{2DX}$ |
| xxxx405H | xxxx 0100 0000 0101 | $MAX_{2D} + 4 \times AVG_{2D}$ |
| | | |
| xxxx7E6H | xxxx 0111 1110 0110 | $MAX_{2D} + 997 \times AVG_{2D}$ |
| xxxx7E7H | xxxx 0111 1110 0111 | $MAX_{2D} + 998 \times AVG_{2D}$ |
| | | |
| xxxx801H | xxxx 1000 0000 0001 | $MAX_{1D}$ |
| xxxx802H | xxxx 1000 0000 0010 | $MAX_{1D} + AVG_{1D}$ |
| xxxx803H | xxxx 1000 0000 0011 | $MAX_{1D} + 2 \times AVG_{1D}$ |
| xxxx804H | xxxx 1000 0000 0100 | $MAX_{1D} + 3 \times AVG_{1D}$ |
| xxxx805H | xxxx 1000 0000 0101 | $MAX_{1D} + 4 \times AVG_{1D}$ |
| | | |
| xxxxBE6H | xxxx 1011 1110 0110 | $MAX_{1D} + 997 \times AVG_{1D}$ |
| xxxxBE7H | xxxx 1011 1110 0111 | $MAX_{1D} + 998 \times AVG_{1D}$ |

FIG. 6

| PICTURE MODE | MEMORY ADDRESS | CF FREE SPACE |
|---|---|---|
| ONE DIAMOND | xxxx | $MAX_{1D}$ |
| ONE DIAMOND | xxxx + 1 | $MAX_{1D} + AVG_{1D}$ |
| ONE DIAMOND | xxxx + 2 | $MAX_{1D} + 2 \times AVG_{1D}$ |
| ONE DIAMOND | xxxx + 3 | $MAX_{1D} + 3 \times AVG_{1D}$ |
| ⋮ | | |
| ONE DIAMOND | xxxx + 3E7h | $MAX_{1D} + 998x \times AVG_{1D}$ |
| TWO DIAMONDS | xxxx + 401h | $MAX_{2D}$ |
| | xxxx + 402h | $MAX_{2D} + AVG_{2D}$ |
| | | |

FIG. 7

| PICTURE COUNT | CF FREE SPACE | INCREMENTS |
|---|---|---|
| 1 | MAX | |
| 2 | MAX + AVG | |
| 3 | MAX + 2 × AVG | |
| 4 | MAX + 3 × AVG | |
| ⋮ | | |
| 20 | MAX + 19 × AVG | |
| 22 | 10 MB | 2 MB |
| ⋮ | 12 MB | 2 MB |
| ⋮ | 14 MB | 2 MB |
| 40 | 16 MB | 4 MB |
| ⋮ | ⋮ | ⋮ |
| 80 | 32 MB | 8 MB |
| ⋮ | ⋮ | ⋮ |
| 160 | 64 MB | 16 MB |
| ⋮ | ⋮ | ⋮ |
| 320 | 128 MB | 32 MB |
| ⋮ | ⋮ | ⋮ |
| 640 | 256 MB | 64 MB |
| ⋮ | ⋮ | ⋮ |
| 999 | 512 MB | 128 MB |
| ⋮ | ⋮ | ⋮ |
| 999 | 1024 MB | |

FIG. 8

DIGITAL STILL CAMERA WITH REMAINING PICTURE COUNT INDICATION

BACKGROUND OF THE INVENTION

The present invention relates to electronic still photography, and more particularly, to a digital still camera (DSC) with an improved method of determining and indicating to a user the number of pictures that can still be taken with the camera and recorded in its internal or removable memory.

DSCs are rapidly gaining in popularity with consumers as an alternative to conventional still cameras that use silver halide film. The number of pixels in charge coupled device (CCD) image sensors has increased to the point where picture detail and clarity are acceptable to consumers. The digital images can be selected and enhanced before printing with home photo album software, eliminating the cost and inconvenience of purchasing and developing traditional camera film. Advancements in ink jet and laser printer technology, inks and paper allow color prints to be generated from digital images that rival the quality of silver halide color prints. Digital images taken with a digital still camera can be cut and pasted into various word processing and other publishing applications used on personal computers (PCs). In addition, the digital images can be used in web pages and can be transmitted over the Internet. From an environmental standpoint, electronic still photography is attractive because it reduces the need for silver halide film manufacture as well as the handling and disposal of chemical developer solutions.

Film cameras typically indicate the remaining picture count to the user, i.e. they show a number on the camera housing that tells the user how many additional pictures can still be taken before the film has been used up. The remaining picture count is typically noted either before an outing with photographic opportunities, or during the outing. A typical film camera will indicate a numeral on a mechanical wheel visible through a window, or on an LCD display, representing the number of exposures left on the film, normally starting at twenty-four or thirty-six, depending on the size of the roll of film loaded in the camera. Some film cameras indicate the number of pictures taken and the user then easily determines, by subtraction, how many exposures remain on the roll of film. Clearly, with film cameras, each picture or image taken utilizes the same amount of film regardless of the camera's settings and regardless of the subject matter photographed.

Digital still cameras typically store pictures on a removable storage media such as a floppy disk, flash memory card or CD-R. The pictures are stored in either type of memory as image files which are usually recorded in a standard such as JPEG format. Various data compression techniques are utilized as is well known in the art to maximize the number of image files that can be stored on a given removable storage media. Each image file can utilize different amounts of storage space, in contrast to film images which take up the same uniform length and width of film on a roll. There are several principal factors which determine the image file size. Different photographic subjects will produce different sizes of JPEG compressed image files depending upon the level of detail in a subject. For example, all other factors being constant, a close up electronic still photograph of a bouquet of flowers would generally produce a larger image file size than a photograph of a landscape at a distance including considerable blue sky. Different selected levels of data compression will of course affect the size of the image file. Different selected picture resolutions will also result in different image file sizes for an image of the same object or scene. The picture resolution is the pixel matrix count recorded in the image file.

Many digital still cameras allow the user to select standard or fine picture resolution. These are pre-set in the digital still camera and may be, for example, 1600×1200 (reflecting the layout of the CCD) and 640×480 (sub-sampled). The user must' decide between better detail in the color print image produced with the fine picture resolution versus the greater amount of memory that will be utilized not only to store the picture on the removable media but to store the picture in application software and the increased time to send the image via e-mail. In simple terms, the trade off is picture quality versus the number of pictures that can be stored in memory.

Just as with film cameras, digital still cameras have been provided with remaining picture count indication. The number of pictures that can be taken in a digital still camera depends upon the size of the available memory, either the fixed internal memory or the removable memory and the resulting size of the image files. As previously discussed, the size of the image files varies greatly, depending upon the subject, the level of data compression and the picture resolution. It is impossible to predict the subject of a picture in any remaining picture count algorithm. If such an algorithm were to base a calculation of the remaining picture count based on a predetermined estimated maximum image file size, then there would often still be available memory left when the remaining picture count went to zero. A digital still camera with this remaining picture count determination scheme would be far less competitive in the marketplace because users would think it could not store as many pictures. If such an algorithm were to base a calculation of the remaining picture count based on a predetermined estimated minimum image file size then the user might be disappointed when the camera could not take a picture even though the remaining picture count was greater than zero. If such an algorithm were to base a calculation of the remaining picture count based on a predetermined estimated average image file size then the user might suffer either or both of the aforementioned undesirable outcomes.

U.S. Pat. No. 5,027,214 of Fujimori assigned to Olmpus Optical Company, Ltd. discloses an electronic still camera in which a data compression means applies a variable length data compression to the digital signal from an A/D conversion means connected to an image pickup means and each "one-frame compressed image data" is assigned a space on the recording medium and calculating and indicating means are used to indicate the recordable number of images. The calculating means calculates an estimated count which can be recorded "in accordance with quantitative data per frame associated with the plurality of one-frame compressed image data recorded in the recording medium by said recording means and quantitative data associated with the recording capacity of the recording medium." The calculating means of the '214 Fujimori patent can calculate an estimated count of recordable electronic still images that can be recorded in the recording medium by dividing a remaining recording capacity of the recording medium by at least one maximum, minimum and average capacities per frame of the image data.

U.S. Pat. No. 4,746,993 of Tada assigned to Sony Corporation discloses an electronic still camera which stores images in tracks on a magnetic disk and has an indicator for displaying "data concerning the use and availability of space on the record medium." The detailed description refers to the availability of tracks since it relies on a magnetic disk and indicates that one picture can be stored per fixed number of tracks. Image resolution can be selected but it does not appear that variable-length data compression is utilized or any means for calculating the number of pictures that can still be stored based on the maximum, minimum or average size of the image files of the pictures already taken. An arithmetic circuit derives the number of occupied and available tracks which are then displayed, which number of tracks equates to the number of pictures stored and that can be stored. The '993 Tada patent indicates that the number of "shots" that can be taken can be displayed.

U.S. Pat. No. 5,034,804 of Sasaki et al. assigned to Toshiba discloses a digital still camera with variable-length encoding data compression in which the available space in the memory card is determined. If the available memory space is inadequate to store a picture, the image data is stored in a buffer memory and the next photographic operation is inhibited until a new memory card is inserted.

The techniques that have heretofore been utilized in digital still cameras to calculate the remaining picture count have been unduly complex. This adds to the processing load of the camera's microprocessor. In addition, errors in the remaining picture count can still occur under certain circumstances with these prior art approaches. Furthermore, these prior art approaches have not been designed to optimally accommodate various combinations of user selected picture resolution and user selected data compression level.

SUMMARY OF THE INVENTION

It is therefore the primary object of the present invention to provide a digital still camera (DSC) that utilizes an improved algorithm for determining and indicating to a user the number of pictures that can still be taken with the camera and recorded in its internal or removable memory.

It is another object of the present invention to provide an improved method of operating a digital still camera to provide a reliable remaining picture count under a variety of picture modes.

In accordance with the present invention a digital still camera includes an image sensor mounted in a housing for receiving light transmitted through a lens and generating output signals representative of an image of an object or a scene of interest. A processing circuit is mounted in the housing and is connected to the image sensor for processing the output signals from the image sensor. A control circuit is mounted in the housing and is connected to the processing circuit for successively generating a plurality of image files corresponding to a plurality of images and storing the image files in a memory in accordance with a selected one of a plurality of picture modes. The control circuit determines a remaining picture count after each image file has been generated based on a predetermined decrement number corresponding to each image file. A display, audio device or some other mechanism is mounted in the camera housing for indicating the remaining picture count to a user.

The present invention also provides a novel method of operating a digital still camera that involves the first step of selecting one of a plurality of picture modes on a digital still camera. The next step of the method involves taking a picture with the camera. The next step of the method involves storing an image file representing the picture in a memory in the camera in accordance with the selected picture mode. The next step of the method involves determining a remaining picture count after the image file has been stored in the memory based on a predetermined decrement number corresponding to the image file. The final step of the method involves indicating the remaining picture count to a user.

In a first alternate embodiment a predetermined decrement number is not automatically associated with a given image file size in a selected picture mode. Instead a remaining free space, determined after each picture is taken, is searched through a lookup table to find a picture count associated with its address. In a second alternate embodiment the picture count is reduced by a rough number until the free space goes below a predetermined memory capacity, such as eight megabytes, at which time the picture count is determined according to the previous look up table searching method.

BRIEF DESCRIPTION OF THE DRAWINGS

FIG. 4 illustrates an example of a look up table that may be used in executing the remaining picture count algorithm illustrated in FIG. 3.

FIG. 5 illustrates look up table constructions for three diamond, two diamond and one diamond picture modes.

FIG. 6 illustrates a physical layout for the look up tables.

FIG. 7 illustrates an alternate look up table construction.

FIG. 8 illustrates an alternate remaining picture count look up table.

DESCRIPTION OF THE PREFERRED EMBODIMENTS

Figure 1:
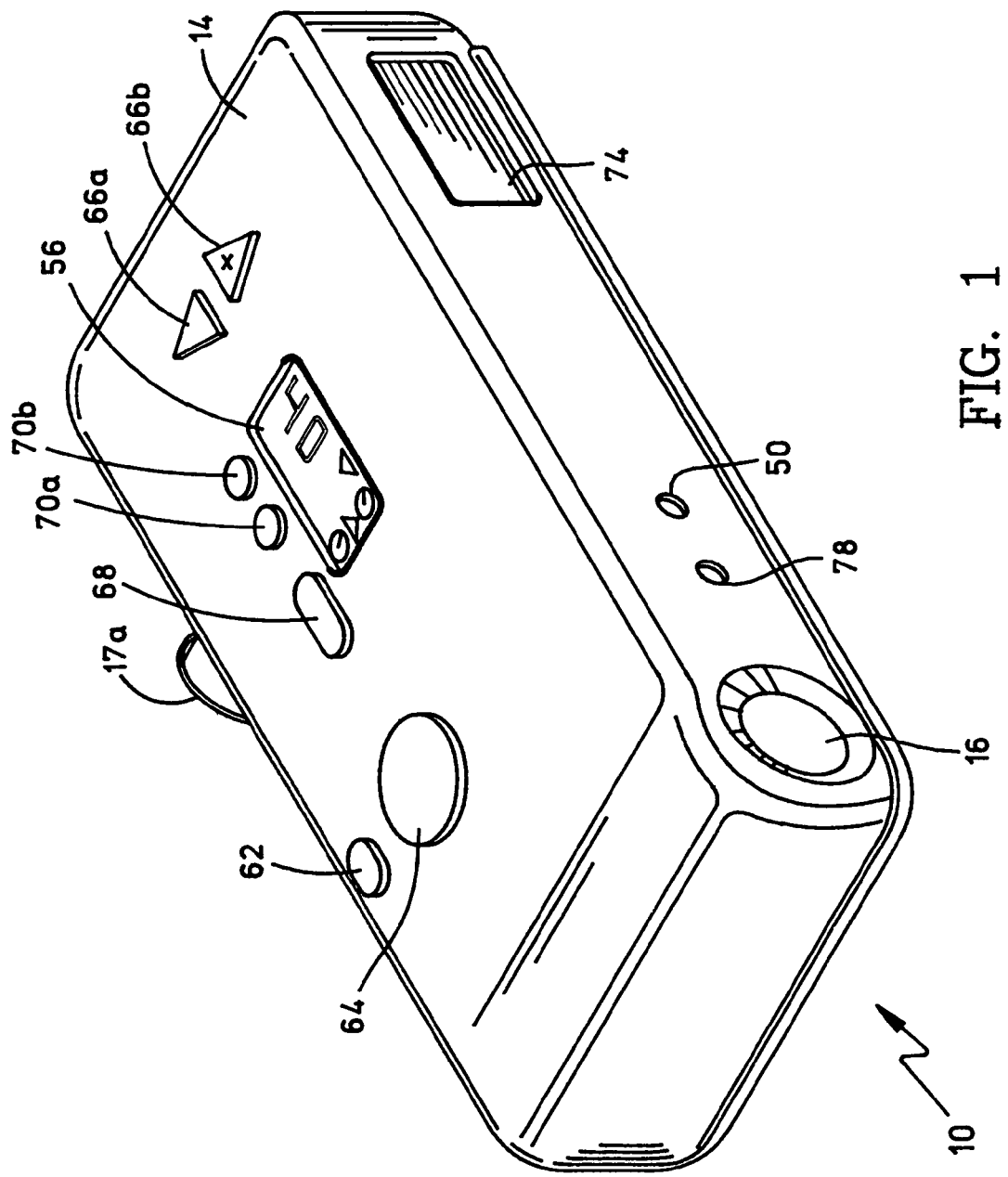
FIG. 1 is a perspective view of a digital still camera constructed in accordance with a preferred embodiment of the present invention.
Figure 2:
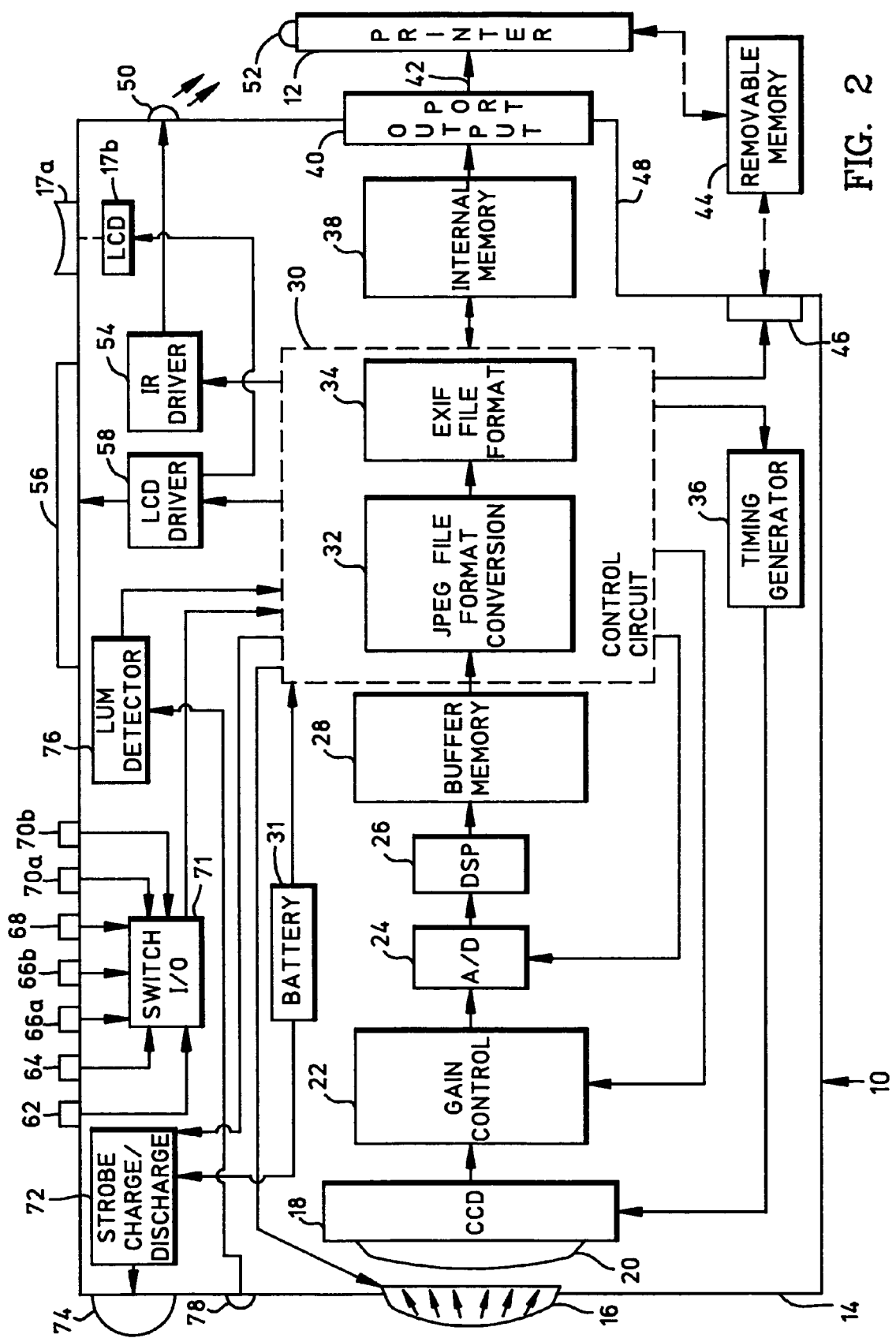
FIG. 2 is a block diagram of the digital still camera of FIG. 1 illustrating its electronic circuitry.

Referring to FIGS. 1 and 2, a digital still camera (DSC) 10 is shown in perspective and block diagram form, respectively. The camera 10 is capable of transferring digital images to a printer 12 (FIG. 2) via cable connection, removable memory or wireless transmission. Referring to FIG. 1, the camera 10 includes a compact, generally rectangular outer plastic camera body or housing 14 that encloses and supports the operative components of the camera in conventional fashion. A lens 16 is mounted in a forward side wall of the housing 14 for transmitting therethrough light from objects and scenes of interest. An eyepiece 17a (FIGS. 1 and 2) on the rear side wall of the housing 14 forms part of a view finder that allows the user to view objects and/or scenes of interest through the lens 16 or to view electronically recorded images displayed on a small, internal color liquid crystal display (LCD) 17b (FIG. 2). This is accomplished using a pair of pivoting mirrors (not illustrated) inside of the housing 14.

An image sensor 18 (FIG. 2), preferably in the form of an array of charge coupled devices (CCDs), is mounted in the housing 14 behind the lens 16 for receiving the light transmitted through the lens 16. The camera 10 preferably includes a shutter or aperture stop (not illustrated). A lens is not necessary in a camera design that utilizes a pin hole as a light aperture. The image sensor 18 generates analog output signals representative of an image of an object or scene of interest. One of the mirrors inside the housing 14 may be pivoted to selectively send light received through the lens 16 to the eyepiece 17a or the image sensor 18. The other mirror may be pivoted to allow the user to view objects and scenes through the lens 16 or to view electronic images on the internal LCD 17b as indicated by the dashed line in FIG. 2.

Referring to FIG. 2, an array 20 of color filters overlies the forward side of the image sensor 18. The analog signals from the image sensor 18 are serially fed to a gain control circuit 22 the output of which is fed to an analog-to-digital (A/D) converter 24. The digital output of the A/D converter 24 is fed to a digital signal processing (DSP) circuit 26, the output of which is fed through a buffer memory 28 to a control circuit 30. The control circuit 30 receives power from a battery 31 and includes a micro-controller or microprocessor as well as a JPEG file format conversion component 32 and an EXIF file format component 34.

Referring still to FIG. 2, light from images and scenes of interest enters the camera 10 through the lens 16 as indicated diagrammatically by the arrows and passes through the color filters 20 before being focused on the active face of the image sensor 18. As is well known in the art, the color filters associated with the various detectors in the CCD array of the image sensor 18 cause the detectors to be sensitive to light of one particular color. By way of example only, the CCD detectors may be configured in a repeating pattern of two by two groups in which the top right detector is sensitive to red light, the top left detector is sensitive to blue light, the bottom right detector is sensitive to green light and the bottom left detector is sensitive to blue light. Each detector of the CCD array accumulates a charge that represents the amount of light in one CCD pixel. A timing generator 36 is coupled between the control circuit 30 and the image sensor 18. The timing generator 36 controls the reading of the array of CCD detectors that make up the image sensor 18 in conventional fashion. The charge accumulated by each CCD detector is serially applied to the input of the gain control circuit 22.

The timing generator 36 (FIG. 2) is capable of periodically flushing the CCD array of the image sensor 18. The gain control circuit 22 implements a conventional correlated double sampling process. This double sampling process accounts for overshoot and undershoot in the outputs of the CCD detectors as the output voltages from each of the detectors in the CCD array are read. The A/D converter 24 converts to digital values the analog voltages read from the CCD detectors after they have been adjusted by the gain control circuit 22.

The DSP 26 (FIG. 2) processes the digital signals from the A/D converter 24 so as to provide a demosaic function, and also performs automatic white balance detection and correction, as well as image sharpening functions in accordance with well known techniques. By way of example, the DSP 26 may be provided in the form of Part No. HD49811TFA commercially available from Hitachi. The output of the DSP 26 is a set of image pixels, each of which represents the color of a particular portion of the image that was captured by the CCD array of the image sensor 18. The entire set of image pixels associated with a complete flushing of the CCD array represents a single image of an object or scene of interest whose "picture" has been "taken" with the camera 10.

The micro-controller of the control circuit 30 (FIG. 2) may execute firmware to provide the JPEG file format conversion component 32. Alternatively, the JPEG file format conversion component may be a dedicated hardware circuit or a combination of hardware and software. The JPEG file formal conversion device compresses the output received from the DSP 26 through the buffer memory 28 in accordance with a well known JPEG data compression standard. The image information which is in JPEG format is fed to the EXIF file format component 34 which embeds the JPEG format image information within a file that conforms to the DIGITAL STILL CAMERA FILE FORMAT STANDARD (Version 1.0, Jul. 13, 1995) commonly known as EXIF. The micro-controller of the control circuit 30 may execute firmware to provide the EXIF file format component 34. Alternatively, the EXIF file format component 34 may be a dedicated hardware circuit or a combination of hardware and software.

Referring again to FIG. 2, the portions of the camera 10 represented by the elements 22, 24, 26, 28 and 36 process the output signals from the image sensor 18 as pictures are taken in succession to generate sets of pixels representative of a plurality of images of objects or scenes of interest. The control circuit 30 converts these sets of pixels into a plurality of image files representing images of the objects and scenes of interest. The image files are in the EXIF file format and represent a sequence of pictures taken with the camera 10. These image files may be stored in an internal memory 38 and can be conveyed via an output port 40 mounted in the housing 14 of the camera to a cable 42 connected to the printer 12. By way of example, the memory 38 may comprise a non-volatile random access memory ("NVRAM") portion and a volatile RAM portion. Alternatively, it will be understood by those skilled in the art that the cable 42 could be connected to a PC (not illustrated) so that the image files in EXIF format could be further processed in the PC, displayed on its monitor, or downloaded to a printer connected to the PC. Alternatively, as described herein later on in detail, the user of the camera 10 may choose to transmit selected image files to the printer 12 via a removable memory 44.

The memory 44 (FIG. 2) is preferably a compact flash memory card or so-called "CF card" that plugs into a female connector 46 in a receptacle or slot 48 formed in an outer surface of the camera housing 14. A floppy diskette, CD-R or some other form of removable storage media could be used instead of a CF card. As another alternative, the user of the camera 10 may choose to transmit selected image files to the printer 12 by utilizing a wireless data link including an infrared (IR) transmitting device 50 (FIGS. 1 and 2) mounted in an outer surface of the camera housing 14. In such a case, the printer 12 receives the IR radiation in which image data has been encoded via an IR receiver 52 (FIG. 2) mounted on the exterior of the printer housing. The printer 12 has conventional circuitry connected to the IR receiver 52 for decoding the image data from the received IR signals. The IR transmitting device 50 is connected to an IR driver circuit 54 which is controlled by control circuit 30 to transmit the desired image data as hereafter described.

A display 56 (FIG. 1) is mounted in the top side of the camera housing 14 for viewing by the camera user. The display 56 is preferably an LCD that can display alphanumeric and graphical information. The display 56 is driven in conventional fashion by the LCD driver circuit 58 (FIG. 2) controlled by the control circuit 30. The LCD driver circuit 58 also drives the internal LCD 17b on which recorded images are displayed upon command for viewing through the eyepiece 17a of the camera viewfinder. The display 56 can display a series of menus providing a plurality of command options that can be selected by the user as part of a graphical user interface (GUI) generated by the control circuit 30 using a control program 20 stored in the internal memory 38. The display 56 can also indicate a remaining picture count, preferably up to 999.

A plurality of manually actuable controls 62, 64, 66a, 66b, 68, 70a and 70b (FIGS. 1 and 2) are mounted in the outer surface of the camera housing 14 so that they can be readily manipulated by the fingers of the user while viewing the display 56. By way of example, the manually actuable controls 62, 64, 66a, 66b, 68, 70a and 70b may be of the pushbutton type. The pushbutton 62 may be depressed to power the camera 100N and OFF and the pushbutton 64 may be depressed to "take a picture". The manually actuable controls 66a and 66b may be depressed to scroll up and down through command options displayed on the display 56. The pushbutton 68 depressed to select the command option currently highlighted or marked with a cursor. The other push buttons 70a and 70b may be depressed to control other functions such as current strobe mode selection and date/time entry, respectively. The current strobe mode can be selected from a "strobe ON", a "strobe OFF", an "AUTOMATIC" strobe mode, a "RED EYE AUTO" strobe mode and a "RED EYE ON" strobe modes. Each time the pushbutton 70a is depressed an indication of the current strobe mode can be displayed by the LCD 56. When the desired current strobe mode is displayed, it can be selected and activated in the camera 10, by, for example, depressing the pushbutton 68.

The user can depress the strobe pushbutton 70a (FIGS. 1 and 2) with his or her index finger to set a current strobe mode for the current picture taking session once the DSC 10 has been powered ON. The manually actuable controls on the camera housing 14 could include a dial rotatable (not shown) to select one of several different modes of operation by placing a pointer on the dial next to the desired mode. These different operating modes may include a picture mode, a review/preview mode, a date/time entry mode, and so forth. The dial would be used for mode selection in lieu of, or as an alternative to, mode selection through the GUI via pushbuttons 66a and 66b. The manually actuable controls 62, 64, 66a, 66b, 68, 70a and 70b interface with the control circuit 30 through a switch input/output (I/O) buffering device 71 (FIG. 2) in conventional fashion.

A conventional strobe charge/discharge circuit 72 (FIG. 2) is connected between the control circuit 30 and a strobe or flash 74 (FIGS. 1 and 2) mounted in a front side of the camera housing 14. The strobe 74 may comprise a gas discharge tube which will flash a bright light on the object or scene of interest when "fired" or energized by the strobe charge/discharge circuit 72 (FIG. 2) in response to a command from the control circuit 30. The strobe 74 is fired in accordance with the current strobe mode during a current picture taking session. The strobe charge/discharge circuit 72 receives power from the battery 31. When the DSC 10 is set to an AUTOMATIC strobe mode the ambient luminescence is detected by the control circuit 30 of the DSC 10 each time a picture is taken and the strobe 74 is energized if needed in accordance with pre-programmed luminescence levels. To facilitate this operation, the DSC 10 includes a luminescence detector circuit 76 (FIG. 2) that receives the analog output signal of a suitable luminescence detector 78 (FIGS. 1 and 2) mounted in the front side of the camera housing 14.

The control circuit 30 also causes a series of menus to be displayed on the display 56 providing command options that can be selected upon manual actuation of one of the pushbutton controls. Upon manual actuation of certain ones of the pushbutton controls in the appropriate sequence the control circuit 30 causes individual stored images to be displayed on the small internal LCD 17b so that they can be viewed via the eyepiece 17a (FIGS. 1 and 2) of the viewfinder. The LCD 56 on top of the camera housing 14 is used solely for displaying alphanumeric data and graphic symbols as part of the GUI. The control circuit 30 causes a markup file to be generated in response to the user's selection of a first predetermined sequence of command options via manipulation of the pushbutton controls. The markup file represents the designation of image files for further processing. The markup file can include information not only about which pictures are being selected, but how many copies are desired. In addition, the markup file can also include information about image enhancements to be performed on the selected images, such as rotation, cropping, brightening, etc.

Once the markup file has been generated, the user can, by following the appropriate menus on the display 56 and actuating the appropriate pushbutton controls, send the designated image files to the printer 12 via the cable 42, removable memory 44 or IR transmitter 50. Regardless of the mode of data transfer, the printer 12 receives all of the selected image files designated in the markup file and all of the information about quantity and enhancements. The markup file need only be created once by the user, and the information designated therein can then be used in any of the three modes of data transmission, i.e. via cable 42, removable memory 44 or IR transmitter 50.

As part of the GUI the control circuit 30 also causes a menu of various strobe modes to be displayed on the LCD 56, including a "strobe ON" mode, a "strobe OFF" mode, an "AUTOMATIC" strobe mode, a "RED EYE AUTO" strobe mode and a "RED EYE ON" strobe mode. Any single one of these modes can be selected as the default strobe mode using the GUI, e.g. by scrolling with pushbuttons 66a and 66b and depressing pushbutton 68 when the desired strobe mode is either highlighted or marked with a cursor.

Referring now to FIG. 2, when the DSC 10 is powered ON the control circuit 30 checks the memory 38 in order to determine which strobe mode to go into. Once the DSC 10 has been powered ON, the user can select the strobe mode in two different ways. First, the user can depress the strobe pushbutton 70a on the top of the camera housing 14. Second, the user can select the strobe mode via the GUI using one or more of the pushbutton controls and following the menus shown on the LCD display 56. Using the strobe pushbutton 70a allows the strobe mode to be changed for the current picture taking session only. Once the DSC 10 is powered OFF, the current selected strobe mode is "forgotten". Using the GUI, the user can set a default strobe mode, i.e. from that point forward, the DSC will operate in that strobe mode, and will go into that strobe mode when the DSC is later powered ON until the user changes the strobe mode setting via the GUI.

The picture modes that may be selected through the GUI via pushbuttons 66a and 66b include at least two different picture resolutions (pixel counts) and at least two different data compression levels, i.e., compression settings for the JPEG. Alternatively, the picture mode could be selected by actuation of one of the pushbuttons which could be dedicated to this function. Picture modes could also be selected via a rotatable dial (not shown) as previously indicated. Preferably various pre-set combinations of picture resolution and data compression level are available to the user and indicated on the display 56 by one or more diamond symbols. The higher the number of diamond symbols indicated, the more pixels and less data compression is used in generating the image file yielding a more aesthetically pleasing color print. When the user lessens the number of diamonds displayed in the picture mode, the data compression rate will be increased, resulting in a smaller file size of the image file and a color print of lesser quality. By way of example, three pre-set diamonds could indicate a 1600×1200 pixel count at low compression, two diamonds could indicate a 1600×1200 pixel count at high compression, and one diamond could indicate a 640×480 pixel count at high compression. Each of these three pre-set picture modes will result in different sizes of image files being stored in memory for the same photographic subject.

Figure 3:
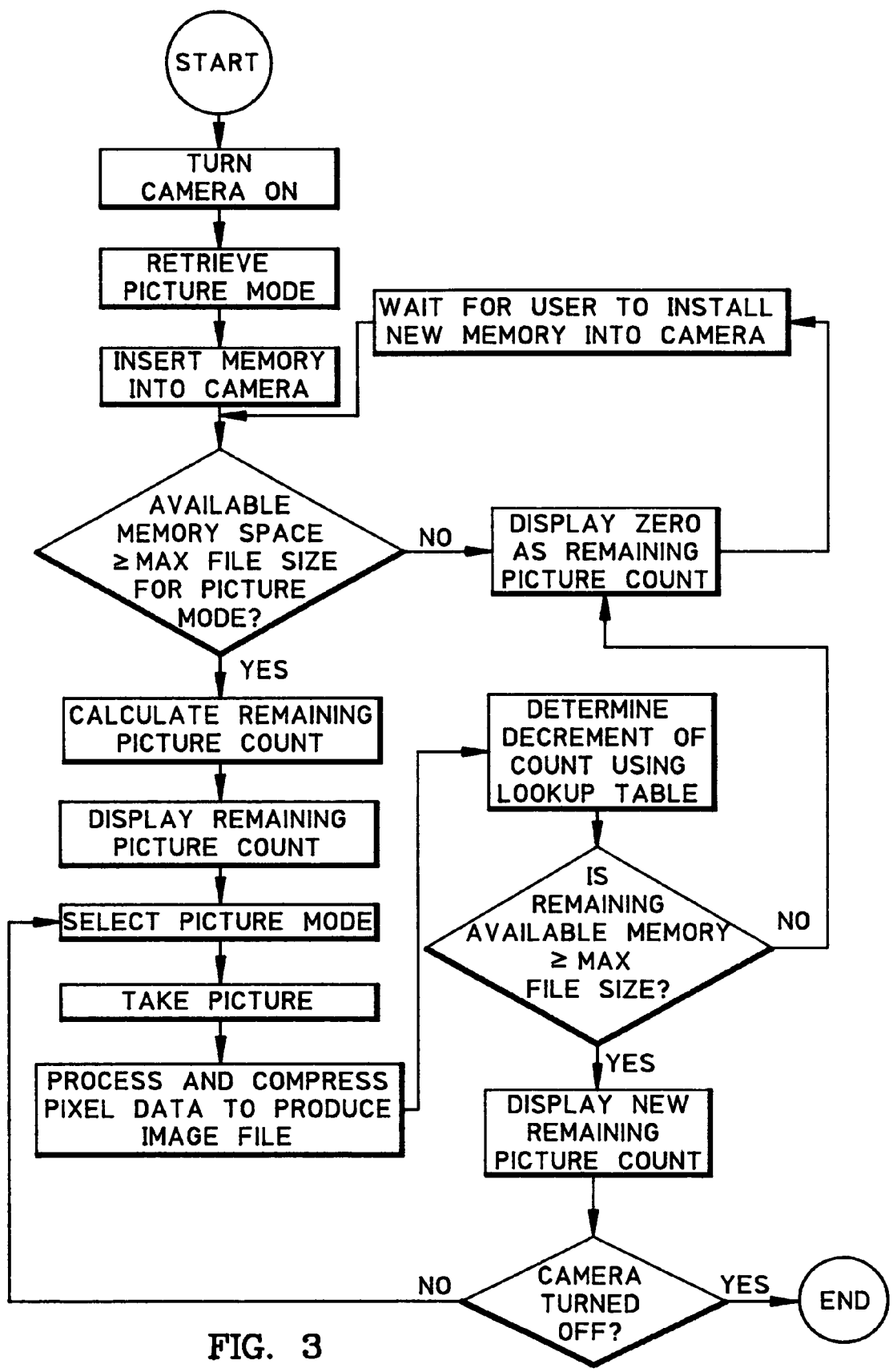
FIG. 3 is a flow diagram illustrating the operation of the remaining picture count algorithm of the digital still camera of FIGS. 1 and 2.

FIG. 3 is a flow diagram illustrating the operation of a first embodiment of the remaining picture count algorithm of the digital still camera of FIGS. 1 and 2. The remaining picture count algorithm may be part of the control program executed by the control circuit 30. Initially the camera 10 is turned ON by depressing pushbutton 62.

Before taking a picture, the user selects the desired picture mode, strobe mode and so forth as explained above. This is accomplished via the manually actuable controls 66*a*, 66*b*, 68 and 70*a*, observing the display 56 and using the GUI powered by the control circuit 30 and the stored control program. As described above, the selected picture mode is preferably indicated on the display 56 by the number of diamond symbols shown, which in turn represent specific pre-set combinations of predetermined picture resolutions and data compression levels available to the user. It should be understood, however, that the picture modes could be simply a selected one of a plurality of different picture resolutions or a selected one of a plurality of data compression levels. The control circuit retrieves the picture mode that has been selected by the user.

A removable memory 44 such as a CF card is inserted into the camera 10 either before or after turning the camera ON. The control circuit 30 accesses the removable memory 44 and determines how much space is available to store image files. The removable memory 44 may be empty or it may have one or more files already stored on the same. The control circuit 30 next determines whether the available memory space is greater than or equal to a predetermined maximum image file size (for the selected picture mode) written into the remaining picture count algorithm. If not, then the control circuit 30 causes a zero to be indicated on the display under a heading or legend that reads REMAINING PICTURES. The control circuit 30 then waits for the user to install a different removable memory into the camera 10 in place of the removable memory 44 before a picture can be taken. The foregoing process of assessing the space available on the new removable memory is repeated.

Once the control circuit 30 determines that there is at least enough unused space in the removable memory to store the predetermined maximum image file size an initial remaining picture count is calculated. The initial remaining picture count may be calculated, for example, by dividing the available memory space by a predetermined average size of image file that is written into the remaining picture count algorithm. This initial remaining picture count is then indicated to the user on the display 56 and the user can take a picture. If the free memory space available is greater than the maximum remaining picture count that can be displayed, e.g. 999, then the maximum remaining picture count is displayed.

The control circuit 30 checks to see if the picture mode has been re-selected. The pushbutton 64 is manually depressed to take a picture. The output signals from the image sensor 18 are processed and the control circuit 30 converts the pixels into an image file which is first stored in the internal memory 38 for later cable or wireless transmission and/or for subsequent loading into the removable memory 44. The image file is generated with the picture resolution and data compression level previously commanded by selecting the desired picture mode. The sizes of the image files that can result from taking pictures in the different picture modes range from a minimum size, to an average size to a maximum size.

The control circuit 30 determines a remaining picture count number to indicate to the user on the display 56 using a corresponding look up table for each picture mode such as that illustrated in FIG. 4. More specifically, for each picture mode the control circuit 30 accesses a corresponding look up table and uses the size of the image file just generated to ascertain the appropriate decrement number from that table in order to decrement or reduce the current remaining image count. For each picture mode there is a separate look up table for determining the remaining picture count given the amount of free memory space. The remaining picture count is decremented accordingly and the adjusted or new remaining picture count is indicated to the user on the display. However, before the new remaining picture count is displayed, the control circuit must first determine if the remaining available space in the removable memory 44 is sufficient to store the predetermined maximum image file size. This is a safeguard against the situation where the user looks at the remaining count, sees it is at least one, and then changes to a picture mode that has a maximum image file size exceeding the maximum image file size of the current picture mode. If the result of this calculation is zero or less than zero, the camera displays zero for the remaining picture count and a new removable memory must be inserted. If the new remaining picture count is one or greater the new count is displayed. If the camera is turned OFF, the algorithm ends. If the camera is not turned OFF, the control circuit 30 awaits the next picture mode selection and snap shot.

The look up tables are constructed by taking a variety of pictures with the camera in each picture mode. After a large sample is obtained, e.g., more than one thousand pictures, file size statistics are calculated, including maximum, minimum and average file size. Based on this off-line calculation, i.e., external to the camera, the look up tables are constructed and programmed into the camera 10 "at the factory." When the picture count decrement number is determined the actual image file size can be rounded up to the closest one hundred kilobytes before referencing the corresponding predetermined decrement number.

FIG. 5 illustrates look up table constructions for three diamond, two diamond and one diamond picture modes.

For three diamond pictures:
$MAX_3D$=Maximum file size
$AVG_3D$=Average file size.
For two diamond pictures:
$MAX_2D$=Maximum file size
$AVG_2D$=Average file size.
For one diamond picture:
$MAX_{1D}$=Maximum file size
$AVG_{1D}$=Average file size.

A second embodiment of our invention assumes that the camera 10 has a large memory for storing an internal control program executed by the control circuit 30. After a picture has been taken and an image file stored the remaining available space or free space (FS) in the removable memory (CF) is searched through a look up table (FIG. 6) for the selected picture mode. The look up table is searched to find a pair of free space values that bracket an actual free space value determined by the control circuit 30 based on the size of the image file just stored. A logical AND operation is then performed on the corresponding memory address with 3FFh to yield a corresponding remaining picture count.

A linear search method may be used with the look up table of FIG. 6. However, while this search technique is simple to code, it is relatively slow. Alternatively, a binary search method may be used with the look up tables. The advantage of this search technique is that it is much faster as the maximum number of searches equals $\log_2(N)$ where N equals the number of elements, e.g. 999. The disadvantage of the binary search method is that its more complex code requires that the data be in ascending or descending order.

FIG. 7 illustrates an alternate look up table construction. The table starts at an arbitrary address. The remaining picture count equals the five space address less the table start address.

Figure 9:
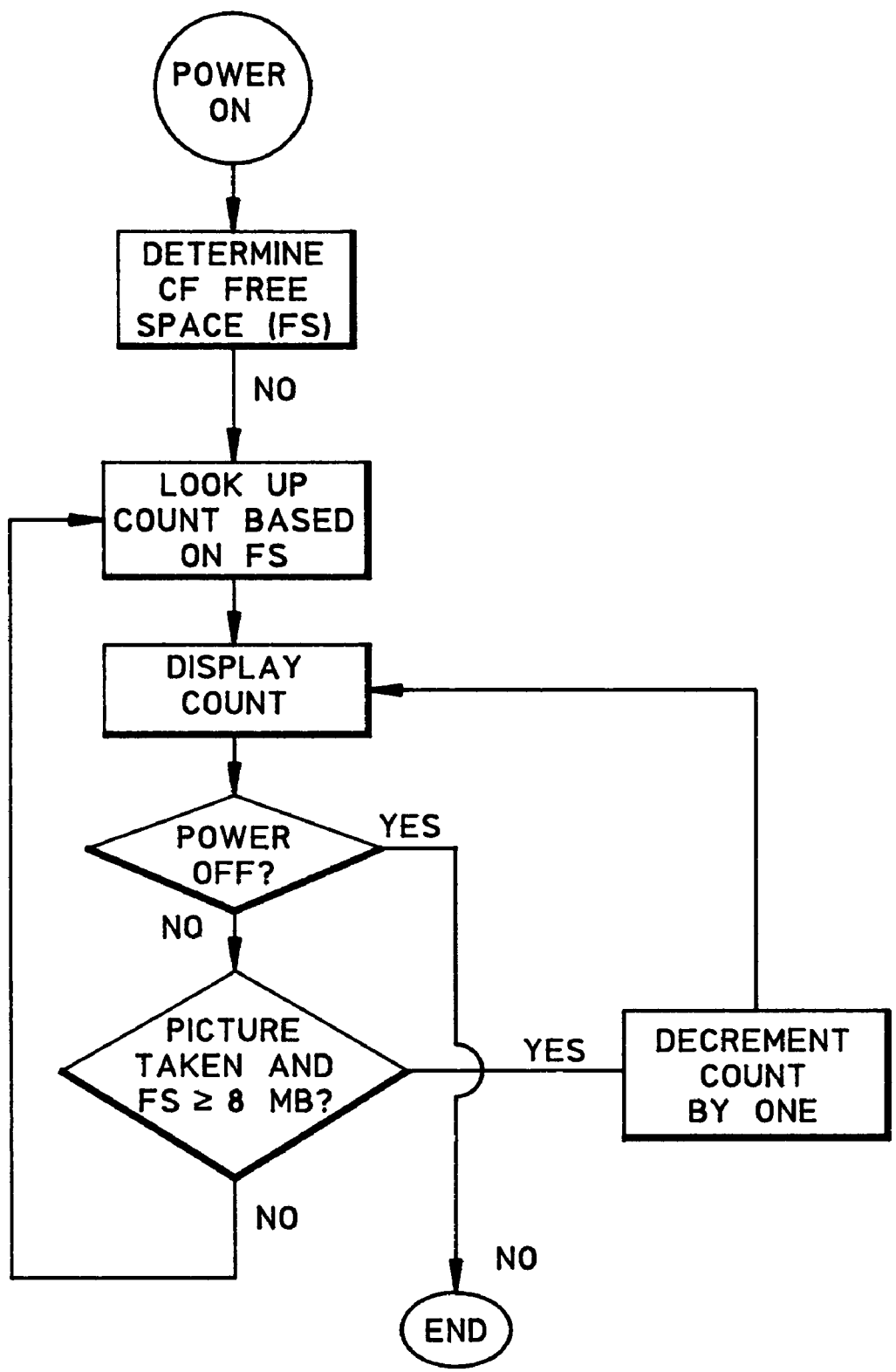
FIG. 9 illustrates an alternate remaining picture count algorithm.

A third embodiment of our invention is illustrated in FIGS. 8 and 9. When a DSC is shipped with a blank CF flash memory card installed it will have a known free space storage capacity, e.g. eight megabytes (8 MB). However, where the user installs a flash memory card with a higher free space storage capacity the remaining picture count algorithm can be modified in accordance with FIGS. 8 and 9. When a large amount of free space on the CF card still exists, e.g. FS≧8 MB, a rough corresponding decrement number, such as one, is applied to the remaining picture count each time a picture is taken. However, once the remaining free space is less than a given capacity, e.g., 8 MB, the remaining picture count is determined in accordance with the second embodiment.

While preferred embodiments of our digital still camera with remaining picture count display have been described and illustrated herein, it should be understood by those skilled in the art that our invention may be varied in both arrangement and detail. For example, our invention can be embodied in other camera designs. Our invention can account for changing memory cards, downloading from a memory card loaded in the camera, and deleting pictures stored on a memory card loaded in the camera. The remaining picture count could be indicated audibly with a voice synthesizer instead of being visually displayed on an LCD, via LEDs, via a mechanically advanced numbered wheel, "fuel gauge" or via other conventional visual display. The camera could be designed to provide an audible or other alarm once the remaining picture count drops to zero. At this point further picture taking could be inhibited and a warning displayed. Therefore, the protection afforded our invention should only be limited in accordance with the following claims.

We claim:

1. A digital still camera, comprising:
   an image sensor mounted in a housing for receiving light and generating output signals representative of an image of an object or a scene of interest;
   a processing circuit mounted in the housing and connected to the image sensor for processing the output signals from the image sensor;
   a memory mounted in the housing;
   a control circuit mounted in the housing and connected to the processing circuit for successively generating a plurality of image files corresponding to a plurality of images and storing the image files in the memory in accordance with a selected one of a plurality of picture modes, the control circuit determining a remaining picture count after each image file is generated based on one of a plurality of predetermined decrement numbers corresponding to an actual image file size of each image file; and
   means mounted in the housing for indicating the remaining picture count to a user.

2. The camera of claim 1 wherein the indicating means includes a display for providing a visual representation of the remaining picture count.

3. The camera of claim 1 wherein the control circuit uses a look up table to retrieve the predetermined decrement number.

4. The camera of claim 1 wherein the control circuit utilizes a plurality of look up tables each corresponding to one of the plurality of picture modes.

5. The camera of claim 1 wherein the control circuit causes the indicating means to indicate that the remaining picture count is zero when the control circuit determines that a remaining capacity of the memory is insufficient to store an image file of a predetermined maximum image file size.

6. The camera of claim 1 the control circuit compresses an output from the processing circuit in generating the plurality of image files.

7. The camera of claim 1 wherein the plurality of picture modes includes a plurality of picture resolutions.

8. The camera of claim 1 wherein the plurality of picture modes includes a plurality of data compression levels.

9. The camera of claim 1 wherein the plurality of picture modes includes a plurality of pre-set combinations of a selected one of a plurality of picture resolutions and a selected one of a plurality of data compression levels.

10. A method of operating a digital still camera, comprising the steps of:
    selecting one of a plurality of picture modes on a digital still camera;
    taking a picture with the camera;
    storing an image file representing the picture in a memory in the camera in accordance with the selected picture mode;
    determining a remaining picture count based on one of a plurality of predetermined decrement numbers corresponding to an actual image file size of the image file; and
    indicating the remaining picture count to a user.

11. The method of claim 10 wherein the indicating step is performed by providing on the camera a visual representation of the remaining picture count.

12. The method of claim 10 wherein the remaining picture count is initially determined based on a capacity of the memory before any image files have been stored in the memory and thereafter the remaining picture count is decremented after each image file has been stored in the memory by a predetermined number corresponding to the actual image file size of the image file just stored.

13. The method of claim 12 wherein the predetermined decrement number corresponding to each actual image file size is retrieved from a look up table.

14. The method of claim 10 wherein the image files are stored in a removable memory.

15. The method of claim 10 and further comprising the step of indicating that the remaining picture count is zero when a remaining capacity of the memory is determined to be insufficient to store an image file of a predetermined maximum image file size.

16. The method of claim 10 and further comprising the step of compressing a set of pixels representing the picture to produce the image.

17. The method of claim 10 wherein the plurality of picture modes includes a plurality of picture resolutions.

18. The method of claim 10 wherein the plurality of picture modes includes a plurality of data compression levels.

19. A digital still camera, comprising:
    an image sensor mounted in a housing for receiving light and generating output signals representative of an image of an object or a scene of interest;
    a processing circuit mounted in the housing and connected to the image sensor for processing the output signals from the image sensor;
    a memory mounted in the housing;
    a control circuit mounted in the housing and connected to the processing circuit for successively generating a plurality of image files corresponding to a plurality of images and storing the image files in the memory in accordance with a selected one of a plurality of picture modes selected from the group consisting of a plurality of picture resolutions, a plurality of data compression levels, and combinations of picture resolutions and data compression levels, the control circuit determining a remaining picture count after each image file is stored in the memory based on a plurality of look up tables each corresponding to one of the plurality of picture modes, the control circuit initially determining the remaining picture count based on a capacity of the memory before any image files have been stored in the memory and thereafter the control circuit decrementing the remaining picture count after each image file has been stored in the memory by one of a plurality of predetermined numbers corresponding to a size of the image file just stored, and the control circuit causing the remaining picture count to be set to zero when the control circuit determines that a remaining capacity of the memory is insufficient to store an image file of a predetermined maximum image file size; and means mounted in the housing for indicating the remaining picture count to a user.

20. A digital still camera, comprising:

an image sensor mounted in a housing for receiving light transmitted through a lens and generating output signals representative of an image of an object or a scene of interest;

a processing circuit mounted in the housing and connected to the image sensor for processing the output signals from the image sensor;

a memory mounted in the housing;

a control circuit mounted in the housing and connected to the processing circuit for successively generating a plurality of image files corresponding to a plurality of images and storing the image files in the memory in accordance with a selected one of a plurality of picture modes, the control circuit determining a remaining picture count by searching a look up table corresponding to the selected picture mode and using an actual image file size of an image file just generated; and means mounted in the housing for indicating the remaining picture count to a user.

21. The camera of claim 20 wherein the look up table is searched in a linear fashion.

22. The camera of claim 20 wherein the look up table is searched in a binary fashion.

23. The camera of claim 20 wherein the control circuit determines the remaining picture count by performing a logical AND operation between a pair of memory addresses.

24. The camera of claim 20 wherein the look up table includes a plurality of different free memory space values and the look up table is searched after each image file is generated to locate a pair of free space memory values that bracket an actual free memory space value determined by the control circuit based on the size of each image file that is stored.

* * * * *

UNITED STATES PATENT AND TRADEMARK OFFICE
CERTIFICATE OF CORRECTION

| | | |
|---|---|---|
| PATENT NO. | : 7,768,558 B1 | Page 1 of 1 |
| APPLICATION NO. | : 09/676649 | |
| DATED | : August 3, 2010 | |
| INVENTOR(S) | : Charles E Schinner et al. | |

It is certified that error appears in the above-identified patent and that said Letters Patent is hereby corrected as shown below:

In column 11, line 61, in Claim 6, before "the" insert -- wherein --.

In column 12, line 40, in Claim 16, delete "image." and insert -- image file. --, therefor.

Signed and Sealed this
Tenth Day of May, 2011

David J. Kappos
*Director of the United States Patent and Trademark Office*